United States Patent [19]
Stober et al.

[11] Patent Number: 4,812,257
[45] Date of Patent: Mar. 14, 1989

[54] PROCESS FOR DRY CATIONIZATION OF STARCH

[75] Inventors: Reinhard Stober, Hasselroth; Wolfgang Fischer, Hanauer; Michael Huss, Eachborn; Klaus Udluft, Mainz, all of Fed. Rep. of Germany

[73] Assignee: Degussa Aktiengesellschaft, Frankfurt, Fed. Rep. of Germany

[21] Appl. No.: 113,970

[22] Filed: Oct. 29, 1987

Related U.S. Application Data

[63] Continuation of Ser. No. 947,458, Dec. 29, 1986, Pat. No. 4,785,087.

[30] Foreign Application Priority Data

Feb. 15, 1986 [DE] Fed. Rep. of Germany ....... 3604796

[51] Int. Cl.$^4$ ............................................. H01M 4/88
[52] U.S. Cl. ............................... 252/182.32; 252/189; 106/120; 127/71
[58] Field of Search .......................... 106/120; 127/71; 252/182.32

[56] References Cited

U.S. PATENT DOCUMENTS 4,070,300 1/1978 Moroni ............................... 428/407

Primary Examiner—Joseph L. Schofer
Assistant Examiner—Peter Mulcahy
Attorney, Agent, or Firm—Beveridge, DeGrandi & Weilacher

[57] ABSTRACT

A dry process for preparation of cationic starch ethers by reaction of starch with alkylidene epoxides in the presence of water in an alkaline medium at a temperature of 5° to 40° C. in the presence of a finely divided silica.

4 Claims, No Drawings

PROCESS FOR DRY CATIONIZATION OF STARCH

REFERENCE TO A RELATED APPLICATION

The present application is a continuation of our copending application Ser. No. 947,458, filed Dec. 29, 1986, now U.S. Pat. No. 4,785,087, which is relied on herein.

The invention relates to a dry process for preparation of cationic starch ethers by reaction of starch with alkylidene epoxides in the presence of water in an alkaline medium.

It is known from the prior art that starch or starch containing substances can be reacted in so called dry processes with cationic etherifying agents. In these processes the reaction is conducted not in an aqueous suspension but with pulverulent starch.

According to U.S. Pat. No. 4,127,563, alkylidene halohydrins at a pH of 9 or lower and a temperature of 25° to 60° C. are used for the cationization.

The reaction of a halohydrin with starch in an alkaline medium, but at a temperature which lies at least 30° C. below the gelatinization temperature of the starch, is claimed in U.S. Pat. No. 3,346,563.

European Pat. No. 31,477 also teaches a process for reaction of starch with alkylidene epoxides, which is conducted in the presence of water, calcium hydroxide or calcium oxide at temperatures of 50° to 120° C.

West German Application No. 2,935,338 teaches a process for cationization of starch, in which, however, the alkali excess must be neutralized.

According to U.S. Pat. No. 4,281,109, it is recommended tht the etherifying reagent and the alkali metal or alkaline earth hydroxide be mixed together beforehand and only thereafter mixed with the starch.

By these procedures it is intended that more homogeneous and faster intimate mixing of the reagents be achieved, so that, for example, high local alkali concentrations, which can lead to swelling of the starch, do not occur.

All cited processes have in common the feature that the reaction mixture must be mixed until completion of the etherification reaction. With decreasing temperature the reaction naturally lasts longer. Reaction vessels are therefore utilized for just as long and cannot be used for other purposes, and stirring energy must be expended. In addition, yield losses have to be accepted and tolerated.

The object of the invention is to provide a process for preparation of cationic starch ethers, in which, despite low reaction temperatures at the same time only very little stirring energy is required, reaction vessels are only briefly tied up in the process and very good yields are obtained, in addition to which screening is not necessary.

The subject matter of the invention is a process for dry cationization of starch by reaction of starch with alkylidene epoxides in an alkaline medium in the presence of water, wherein the reaction is conducted at 5° to 40° C. in the presence of a finely divided silica. The pH of a starch prepared in this way is 9 or higher (5 weight percent suspension).

The procedure according to the invention is that the mixture of starch, alkali metal or alkaline earch hydroxide or oxide, silica and alkylidene epoxide, which in general is used as an aqueous solution, is homogenized in a intensive mixer for 10 seconds to 25 minutes, preferably 20 seconds to 5 minutes, then transferred out, and the dry cationization is allowed to proceed to completion in the designated storage receptacle such as, for example, a silo, or even in the packages provided for shipment.

Thereafter, further mixing energy no longer has to be expended for further process steps.

A further embodiment of the instant invention is an activator which contains 10 to 50 weight percent, preferably up to 40 weight percent of silica. The difference relative to 100% is made up by calcium oxide or calcium hydroxide.

In addition, it proves advantageous to operate preferably in a temperature range within which, depending on, for example, seasonally related fluctuations of the ambient temperature, the room temperature of simple warehouse stores, vary, i.e., from 18° to 30° C., especially 20° to 25° C.

Tests show that the epoxide used is completely consumed by reaction. At a temperature of 20° C. after 7 days, only traces of less than 10 ppm of epoxide per kg of starch are still to be observed.

Starches prepared by the process of the invention do not contain a coarse function and can be used without post treatment (screening).

Suitable as intensive mixers are, for example, plow mixers (continuous and batchwise), wetting flow mixers (continuous). Other suitable mixers can be used.

To prepare cationic starch ethers by the process of the invention, native or modified starches or starch-containing substances of any desired origin can be used. Native wheat, corn, tapioca or potato starches are used with particular advantage.

According to the invention, the etherification of the starch is conducted with alkylidene epoxides of the general formula

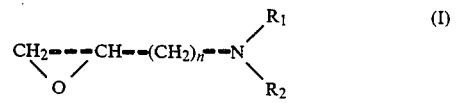

or preferably

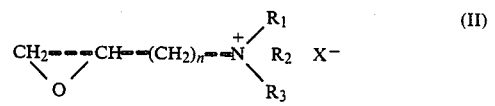

in which n is a number from 1 to 3 and $R_1$, $R_2$ and $R_3$ represent the same or different alkyl groups with 1 to 4 carbon atoms or $R_1$=benzyl, and $X^-$ represents chloride, bromide, sulfate or acetate, preferably chloride. One or more of such epoxides can be used in the process of the invention.

The viscosity of starch pastes is greatly increased when the reaction with the above mentioned epoxides is conducted in the presence of from 0.5 to 5 weight percent of a compound which corresponds to one of the following formulas:

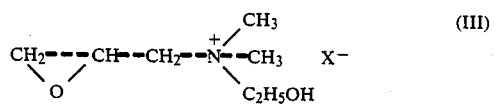

or

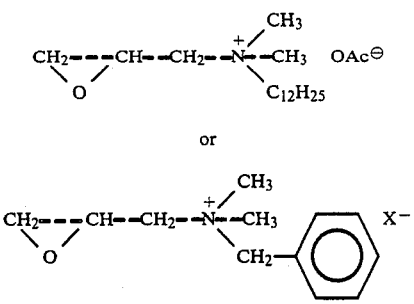

(IV)

or (V)

These compounds are preferably used in a mixture with the epoxides according to formulas (I) or (II) and can also exist therein in the form of the associated epichlorohydrins.

At the latest in the reaction medium, the conversion then occurs to the epoxides according to formulas (III) to (V), which react with the starch.

Mixtures of this type are prepared advantageously by using, in the synthesis of the epoxides with formulas (I) and (II), as is described, for example, in U.S. Pat. No. 3,135,782, the quantities of the appropriate tertiary amines necessary for formation of the proportions specified for the epoxides with formulas (III) to (V). However, these epoxides or chlorohydrins can also be synthesized separately and mixed in the specified ratio with the epoxides according to formulas (I) or (II).

Per mole of starch, calculated as an anhydroglucose unit in the dry substance, 0.005 to 0.500 mole of epoxide according to formula (I) or (II), preferably 0.01 to 0.25 mole of epoxide, is used in the process of the invention. From this results a degree of substitution (DS) of 0.005 to 0.300, preferably 0.01 to 0.20.

According to the invention, the etherification of the starch with the alkylidene epoxides is performed in a medium which contains 10 to 35 weight percent, especially 20 to 25 weight percent, of water and 0.2 to 2.0 weight percent, especially 0.4 to 1.5 weight percent, of an alkali metal or alkaline earth hydroxide or oxide, particularly calcium hydroxide or calcium oxide.

In addition to these components from the prior art, 0.02 to 2.0 weight percent, preferably 0.2 to 1.0 weight percent of a finely divided silica must be present in the reaction mixture, relative to the total quantity thereof.

The finely divided, synthetically produced silicas in question can be precipitated or produced by methods of flame hydrolysis, hydrophilic or hydrophobic. Such methods are well known and are described in the prior art.

The specific surface areas of silicas suitable for this invention range between 60 and 700 $m^2/g$, preferably 100 and 450 $m^2/g$ (BET measurement in accordance with DIN 66,131, $N_2$ absorption at the temperature of the liquid nitrogen, preliminary thorough heating of the sample of 110° C.).

There is preferably used in accordance with the invention hydrophilic precipitated silicas with a specific surface area of 190 to 450 $m^2/g$, especially a spray dried precipitated silica with a specific surface area of 190 $m^2/g$ (BET measurement).

Mixtures of hydrophobic and hydrophilic silicas can also be used.

A pulverulent mixture of silica and the alkaline oxide or hydroxide, especially calcium hydroxide or calcium oxide (referred to as "activator" herein) is preferably used.

The activator contains 10 to 50 weight percent, preferably up to 40 weight percent of silica. The difference relative to 100% is made up by calcium oxide or calcium hydroxide.

However, it is to be taken into account that the activator must exist as a powder and in each case the quantity of activator which exhibits a pH of 9 or higher (5 weight percent starch suspension) in the end product is used.

The order in which the reagents are mixed is in general not to be regarded as critical. However, it has proved advantageous firstly to mix the starch and activator, with each other, for example, in a batch mixer, for up to 10 minutes and thereafter to spray on the epoxide in the form of an aqueous solution.

The mixture obtained in the synthesis of the epoxide by reaction of the corresponding halohydrin with alkaline substances, such as, for example, alkali metal hydroxide, can be used directly if the alkali metal halide formed thereby does not cause problems in the end product, such as present a danger of corrosion. This is neither washed nor neutralized and can be used directly.

Naturally, the neutralization which is customary in the art, as well as thorough washing out of the alkaline earth or alkali metal fraction in the cationized starch can also be performed if these additional steps appears to be useful in view of the intended application of the starch.

By means of the process of the invention it is also possible to prepare highly substituted cold water soluble starches with a degree of substitution of 0.08 to 0.30.

If the operation is performed at existing room or ambient temperatures, a temperature control system is not needed, either for the mixing device or for the subsequent reaction to completion; nevertheless the desired product is obtained with high yields.

Additional reaction vessels are also superfluous, since after intensive intimate mixing the reaction mixture can be poured, for example, into the packages provided for shipment or into a storage silo and react therein. Thus, the method of the present invention does not require long residence times in the reaction vessels.

The short residence time in the mixing apparatus simultaneously permits for the first time the dry cationization to be conducted continuously, whereas, because of the long mixing times, only batchwise cationization of starch has been known and practical according to the state of the art.

By using various types of activator, the invention also makes it possible for the first time to vary the viscosity of the corresponding starch solutions and simultaneously to keep the degree of substitution (DS) of the starch constant.

The cationized starches that can be prepared according to the inention are suitable for use, for example, as retention auxiliaries, as additives to the pulp in paper manufacture for improving the paper strength, in the size press during paper manufacture, as thickeners, as flocculents for sewage treatment and in the manufacture of gypsum.

The following examples are illustrative of the invention.

The following activator types are synthesized for the cationization of starches by intensive mixing:

| Type | Composition (weight percent) | Bulk density |
|---|---|---|
| PC-1 | 58% calcium hydroxide, ca. 97% content 42% silica (spray-dried silica) (190 m$^2$/g) | 0.21 |
| PC-2 | 66% calcium hydroxide, ca. 97% content 34% silica | 0.22 |
| PC-3 | 52% calcium hydroxide, ca. 97% content 48% silica | 0.18 |
| PC-4 | 75% calcium hydroxide, ca. 97% content 25% silica | 0.25 |
| PC-5 | 82% calcium hydroxide, ca. 97% content 18% silica | 0.27 |

EXAMPLES

In examples 1 to 3, the reagent solution in each case contains 0.5 weight percent of 3-chloro-2-hydroxypropyl dimethylethanolammonium chloride relative to 2,3-epoxypropyl trimethylammonium chloride. The analysis data relate to washed out samples (isopropanol/water, 80/20 weight percent).

EXAMPLE 1

50 kg (0.2482 kmol) of native potato starch (water content 19.5%; insoluble nitrogen content 0.008%) is placed in a mixer. After addition of 6.44 kg of activator PC-2, mixing is performed for 5 minutes and 5.137 kg of reagent solution, which contains 1.054 kg of 2,3-epoxypropyl trimethylammonium chloride, is metered in within 5 minutes via a nozzle while the mixer is running. Mixing is continued for a further 10 minutes and the contents are poured into a storage silo. After a residence time of 24 hours at 20° C., a yield of 92.8% are analyzed. The degree of substitution of the cationic starch ether obtained was 0.026. The starch content was 74%. The viscosity of a 3 weight percent starch paste was 1450 mPas (measured with the Brookfield viscosimeter at 20° C. and 100 rpm).

EXAMPLE 2

50 kg (0.2482 kmol) of native potato starch (water content 19.5%; insoluble nitrogen content 0.008%) is placed in a mixer. After addition of 1.006 kg of activator PC-5, mixing is performed for 5 minutes. Thereafter, 5.137 kg of reagent solution with a content of 1.054 kg of 2,3-epoxypropyl trimethylammonium chloride, is metered in within 5 minutes via a nozzle while the mixer is running, and mixing is continued for a further 10 minutes. Thereafter, the contents are poured into a storage silo.

After a residence time of 16 hours at 20° C., a yield of 92.2%, which corresponds to a degree of substitution of 0.0258, was analyzed. The viscosity of a 3 weight percent starch paste was 56 mPas (measured with the Brookfield viscosimeter at 20° C. and 100 rpm). The pH of 5 weight percent starch suspension was 11.8.

EXAMPLE 3

50 kg (0.2482 kmol) of native potato starch (water content 19.5%; insoluble nitrogen content 0.008%) is placed in a mixer. After addition of 0.403 kg of activator PC-5, mixing is performed for 5 minutes. Thereafter, 5.137 kg of reagent solution with a content of 1.054 kg of 2,3-epoxypropyl trimethylammonium chloride, is metered in within 5 minutes via a nozzle while the mixer is running, and mixing is continued for a further 10 minutes. Thereafter, the contents are poured into a storage silo.

After a residence time of 3 days at 20° C., a yield of 91.4%, which corresponds to a degree of substitution of 0.0256, was analyzed. The viscosity of a 3 weight percent starch paste was 1800 mPas (measured with the Brookfield viscosimeter at 20° C. and 100 rpm). The pH of 5 weight percent starch suspension was 9.5.

EXAMPLE 4

50 kg (0.2707 kmol) of native corn starch (water content 12.2%; insoluble nitrogen content 0.035%) is placed in a mixer. After addition of 1.054 kg of activator PC-2, mixing is performed for 5 minutes and a reaction mixture of 2.820 kg of 65% 3-chloro-2-hydroxypropyl trimethylammonium chloride, 1300 kg of 30% sodium hydroxide and 2.893 kg of water is metered in within 5 minutes via a nozzle while the mixer is running. After a further mixing time of 10 minutes, the contents are poured into a storage silo where, after a residence time of 24 hours at 20° C., a degree of substitution of 0.0323, which corresponds to a reaction yield of 89.8%, was determined by nitrogen analysis.

EXAMPLE 5

50 kg (0.2677 kmol) of native tapioca starch (water content 13.2%; insoluble nitrogen content 0.004%) is poured into a mixer. After addition of 1.042 kg of activator PC-2, mixing is performed for 5 minutes. Thereafter, a mixture of 2.483 kg of 73.6% 2,3-epoxypropyl trimethylammonium chloride (0.01205 kmol) and 5.384 kg of water is metered in within 5 minutes, and mixing is continued for a further 10 minutes and then the contents are poured into a storage silo.

After a residence time of 24 hours at 20° C., a yield of 88.8%, which corresponds to a degree of substitution of 0.0400, was determined relative to the 2,3-epoxypropyl trimethylammonium chloride used.

EXAMPLE 6

50 kg (0.2698 kmol) of a converted corn starch (size press starch) with a water content of 12.5% and an insoluble basic nitrogen content of 0.040% is placed in a mixer. After addition of 1.050 kg of activator PC-2, mixing is performed for 5 minutes at 20° C. Thereafter, 1.001 kg of 73.6% of 2,3-epoxypropyl trimethylammonium chloride solution (0.00486 kmol) and 5.817 kg of water are metered in within 5 minutes via a nozzle while the mixer is running, and mixing is continued for a further 10 minutes. After a subsequent residence time of 24 hours at 20° C. in a silo, a reaction yield of 87.5%, which corresponds to a degree of substitution of 0.0158, was analyzed.

EXAMPLE 7

200 kg (1.0805 kmol) of native wheat starch (water content 12.4%, insoluble nitrogen content 0.023%); 6678 kg of 2,3-epoxypropyl trimethylammonium chloride (73.6% active substance=0.0324 kmol); 20.854 kg of water and 3.154 kg of activator PC-1 per hour are continuously metered into a continuous flow mixer and after an average residence time of 10 to 60 seconds are conveyed into a storage silo.

The analysis after a residence time of 24 hours at 20° C. indicated a nitrogen content of 0.226%, relative to absolutely dry starch, without insoluble basic nitrogen, which corresponds to a DS of 0.268 and a reaction yield of 89.3%.

EXAMPLE 8

100 kg (0.5208 kmol) of native potato starch (water content 15.55%, insoluble nitrogen content 0.010%) is placed in a mixer. After addition of 1.351 kg of activator PC-2 and 0.657 kg of 97% calcium hydroxide (0.0086 kmol), mixing is performed for 5 minutes and then 15.028 kg 21.5% 3-chloro-2-hydroxypropyl trimethylammonium chloride (0.0172 kmol) is metered in within 5 minutes while the mixer is running. After a further mixing time of 10 minutes, the contents are poured into a storage silo. After a residence time of 7 days at 20° C., a reaction yield of 92.8%, which corresponds to a degree of substitution of 0.0309, was reached.

EXAMPLE 9

50 kg (0.2482 kmol) of native potato starch (water content 19.5%; insoluble nitrogen content 0.008%) is placed in a mixer. After addition of 0.644 kg of activator PC-2, mixing is performed for 5 minutes. Thereafter, 13.068 kg of 70.3% 2,3-epoxypropyl trimethylammonium chloride (0.0606 kmol) is metered in within 5 minutes via a nozzle while the mixer is running, and mixing is continued for a further 10 minutes. After a residence time of 24 hours at 20° C. (silo), a nitrogen content of 1.382%, which corresponds to a degree of substitution of 0.187, was analyzed. The yield was calculated as 76.6%.

The cationic starch obtained in this way is cold water soluble.

EXAMPLE 10

The starched prepared according to the invention do not contain any coarse fraction and are therefore usable without post treatment (screening). The particle size distribution practically does not change. This means at the same time that the remaining cationization reaction can proceed after homogenization, e.g., even in the shipping container.

Reagent: 2,3-epoxypropyltrimethylammonium chloride
 1.0 weight percent Ca(OH)$_2$
 0.5 weight percent silica

| Potato starch | Particle size distribution | |
|---|---|---|
| Untreated, native | >100 μm 0.5% | <100 μm 99.5% |
| Cationized at 20° C. | >100 μm 0.6% | <100 μm 99.4% |
| (DS 0.040) 40° C. | >100 μm 1.0% | <100 μm 99.0% |
| 50° C. | >100 μm 2.9% | <100 μm 97.1% |
| 80° C. | >100 μm 10.3% | <100 μm 89.7% |

EXAMPLE 11

According to the invention, it is possible to achieve a change in the viscosity of starch pastes at constant degree of substitution: Potato starch (DS 0.026)

| Product from test | Activator | Viscosity of 3% starch paste (20° C.) |
|---|---|---|
| 3 | 1.0% PC-3 | 1800 mPas |
| 1 | 1.6% PC-2 | 1450 mPas |
| As 1, but with | 2.1% PC-4 | 600 mPas |
| 2 | 2.5% PC-5 | 56 mPas |

EXAMPLE 12

Starches cationized by processes of the invention exhibit excellent retention values. These are measured by means of the DDJ test on substance suspensions consisting of 3 g/liter of pulp (50% beach sulfite pulp, 10% spruce sulfite pulp, 40% spruce sulfate pulp), 20° SR and
2 g/liter of filler (China clay).

(D. W. Zunker, A. F. Breazeale, Tappi 66 (11) (1983) 37, K. W. Britt, J. E. Unbehend, Tappi 59 (2) (1976) 67, D. Abson, D. F. Brooks, Tappi 68 (1) (1985) 76)

| | DDJ Test (Dynamic Drainage Jar) | | |
|---|---|---|---|
| | Additive in % | Fines and filler | |
| Starch type | (relative to solid) | in the filler (g) | Retention in % |
| Without starch | | 0.149 | 0 |
| Native potato starch | 0.2 | 0.145 | 3 |
| | 0.5 | 0.149 | 0 |
| Cationic potato | 0.2 | 0.026 | 83 |
| starch (DS 0.031) | 0.5 | 0.008 | 95 |
| (example 8) | | | |
| Cationic potato | 0.2 | 0.054 | 64 |
| starch (DS 0.026) | 0.5 | 0.022 | 85 |
| (example 1) | 1.0 | 0.004 | 97 |

This test exhibits a good correlation with the conditions of the paper machine.

EXAMPLE 13

By the addition of 0.5 weight percent of 3-chloro-2-hydroxypropyl dimethylethanolammonium chloride to the 3-chloro-2-hydroxypropyl trimethylammonium chloride or 2,3-epoxypropyl trimethylammonium chloride cationization reagent, it is possible greatly to increase the viscosity of starch pastes, which as regards use in the paper industry leads to much better retention values and improved properties of the end product.

| Potato starch DS 0.026 | Viscosity (3% paste) | |
|---|---|---|
| Reagent | 80° C. | 25° C. |
| 2,3-Epoxypropyl trimethylammonium chloride | 153 mPas | 918 mPas |
| +0.5% 3-Chloro-2-hydroxypropyl ethanolammonium chloride | 284 mPas | 1450 mPas |

The cationization is performed at 20° C. in the presence of 1.6 weight percent of activator PC-2.

EXAMPLE 14

(potato starch, theoretical DS 0.049)

By addition of silica, a higher reaction yield is obtained during cationization.

| | Yield after 6 days at 20° C. | Flow behavior |
|---|---|---|
| Without silica | 91.4% | Inadequate (does not run out of 18 mm opening) |
| 0.50% silica | 93.9% | Very good (runs out of 2.5 mm opening) |

(Flow cups: inside diameter 90 mm, height 42 mm) The silica is spray dried silica, 190 m$^2$/g surface area.

Further variations and modifications of the foregoing invention will be apparent to those skilled in the art and are intended to be encompassed by the claims appended hereto.

The German priority application No. P 36 04 796.1 is relied on an incorporated hereby by reference.

We claim:

1. A pulverulent mixture consisting of 10 to 50 weight percent of a hydrophilic silica and 50 to 90 weight percent of calcium hydroxide or oxide.

2. A pulverulent mixture consisting 10 to 50 weight percent of a mixture of hydrophilic and hydrophobic silica, 50 to 90 weight percent of calcium hydroxide or oxide, whereby the silica mixture contains up to 20% of hydrophobic silica.

3. A pulverulent mixture according to claim 1 wherein the silica is present in the amount of 10 to 40% by weight.

4. A pulverulent mixture according to claim 1 which has a pH of at least 9.

* * * * *